United States Patent [19]
Deutschmann

[11] Patent Number: 5,337,559
[45] Date of Patent: Aug. 16, 1994

[54] SUPERCHARGED MULTI-CYLINDER INTERNAL-COMBUSTION ENGINE INTERIOR EXHAUST PIPE

[75] Inventor: Herbert Deutschmann, Friedrichshafen, Fed. Rep. of Germany

[73] Assignee: MTU Friedrichshafen GmbH, Fed. Rep. of Germany

[21] Appl. No.: 26,739

[22] Filed: Mar. 5, 1993

[30] Foreign Application Priority Data

Mar. 6, 1992 [DE] Fed. Rep. of Germany ....... 4207048

[51] Int. Cl.5 .............................................. F01N 7/10
[52] U.S. Cl. .................................... 60/321; 60/323
[58] Field of Search ................................. 60/323, 321

[56] References Cited

U.S. PATENT DOCUMENTS 2,125,703  8/1938  Williams .
3,750,403  8/1973  Deutschman ........................ 60/323
3,751,920  8/1973  Rosenlund ........................... 60/323
3,775,979  12/1973  Scheitlin ............................ 60/323
4,179,884  12/1979  Koeslin .............................. 60/323
4,658,580  4/1987  Schley ............................... 60/323

FOREIGN PATENT DOCUMENTS 0469171  2/1990  European Pat. Off. .
3815408  12/1988  Fed. Rep. of Germany ........ 60/323

Primary Examiner—Douglas Hart
Attorney, Agent, or Firm—Evenson, McKeown, Edwards & Lenahan

[57] ABSTRACT

In a water-cooled exhaust pipe which is essentially assembled from cylindrical components, the sections of the interior pipe consist of cylindrically bent, rectangular sheet metal blanks which are elastically inserted into an intermediate wall. The construction minimizes the manufacturing costs of the exhaust pipe.

13 Claims, 6 Drawing Sheets

SUPERCHARGED MULTI-CYLINDER INTERNAL-COMBUSTION ENGINE INTERIOR EXHAUST PIPE

BACKGROUND AND SUMMARY OF THE INVENTION

The present invention relates to an exhaust pipe for a supercharged multi-cylinder internal-combustion engine and, more particularly, to an interior pipe carrying hot exhaust gases and a housing which surrounds the interior pipe at a distance therefrom, is undivided in longitudinal and transverse directions and has a cooling water space constructed between an approximately cylindrical intermediate wall and a cylindrical shell which is sealingly supported on the intermediate wall, and the interior pipe being divided into individual sections in the longitudinal direction, each section of the interior pipe being configured approximately cylindrically from a rectangular sheet metal blank, and the intermediate wall having exhaust gas inlet openings. By way of an encapsulated exhaust pipe, it is achieved that the exhaust gas suffers an only minimal heat loss on its way from the cylinder to the supercharger aggregate, and thus a higher energy potential is available for the supercharging of the internal-combustion engine. In addition, the surface temperature of the exhaust pipe is in the range of the cooling water temperature of the internal-combustion engine, as required for some applications.

European Patent Document EP 0 469 171 A1 shows an exhaust pipe in which the sections of the interior pipe cause an almost complete encapsulation of the hot exhaust gases. The principal purpose of this arrangement is the protection of the intermediate wall from hot gas corrosion caused by exhaust gas. Although on one hand, the high-expenditure construction of the interior pipe permits the use of materials for the intermediate wall which have a low resistance against hot gas corrosion and minimizes the heat loss from the exhaust gas, it results, on the other hand, in excessive manufacturing expenditures for the interior pipe.

It is therefore an object of the present invention to provide an exhaust gas pipe having a simplified construction of the sections of the interior pipe to achieve a reduction of the manufacturing costs.

This object has been achieved according to the present invention by providing the intermediate wall is provided with webs extending radially inwardly, each section of the interior pipe supported on an interior contour of assignee webs, one of the sections of the interior pipe respectively has a C-shaped cross-section and is arranged with an opening sector opposite a respective one of the exhaust gas inlet openings, the other of the sections of the interior pipe are adjacent to the respective one of the exhaust gas inlet opening have an approximately circular cross-section, and longitudinal edges of the C-shaped sections of the interior pipe are operatively arranged, with stop edges constructed on the intermediate wall in the longitudinal direction to protect against torsional influences.

Principal advantages achieved with the present invention are that the support of each section of the interior pipe on webs on the intermediate wall results in an improvement of the form stability of the exhaust pipe in the case of stress caused by shock and vibration, that the C-shaped sections increase the absorbing power of the interior pipe for the hot gas shock load which is caused by the exhaust gases which periodically flow out of the exhaust ducts of the cylinders, and that a lowering of the manufacturing costs is achieved because of the simplified manufacturing of the sections of the interior pipe.

BRIEF DESCRIPTION OF THE DRAWINGS

These and other objects, features and advantages of the present invention will become more readily apparent from the following detailed description of embodiments thereof when taken in conjunction with the accompanying drawings wherein.

DETAILED DESCRIPTION OF THE DRAWINGS

Figure 1:
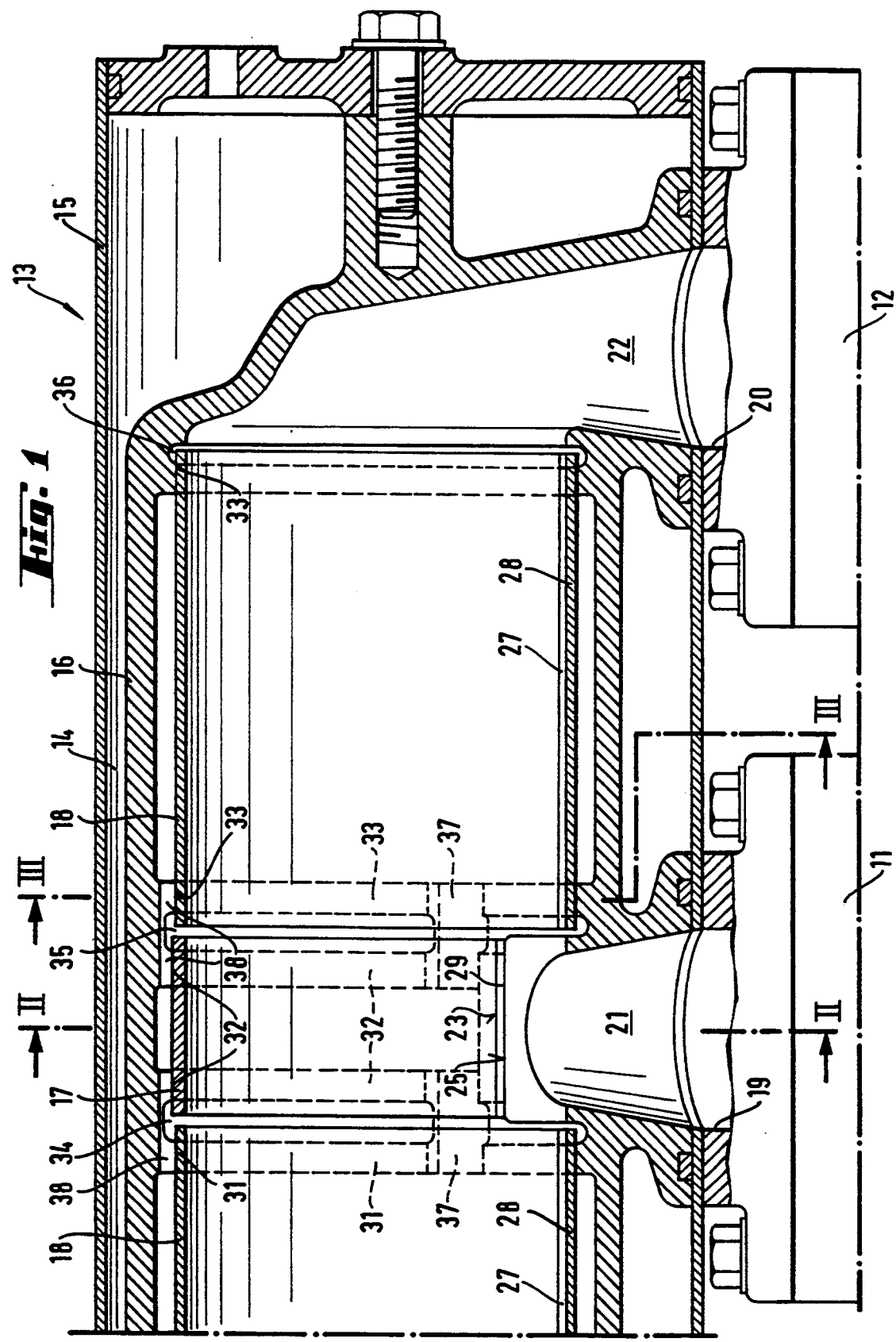
FIG. 1 is a longitudinal sectional view of an end of an exhaust pipe along line I—I in hereinafter described FIG. 2.

In the following description, the two-digit reference numbers apply to the embodiment according to FIGS. 1 to 3, and the three-digit reference numbers apply to the second embodiment according to FIGS. 4 to 6.

On the cylinder heads 11, 12; 111, 112 or a supercharged multi-cylinder internal-combustion engine (not shown in detail), an exhaust pipe 13; 113 is fastened which extends along all cylinder of one bank. The exhaust pipe 13; 113 comprises an interior pipe carrying the hot exhaust gases and a housing which surrounds the interior pipe at a distance, is undivided in the longitudinal and transverse direction and has a cooling water space 14; 114.

The cooling water space 14; 114 or the housing is constructed between a cylindrical shell 15; 115 and an approximately cylindrical intermediate wall 16; 116. The intermediate wall 16; 116, has exhaust gas inlet openings 21, 22; 121, 122 which correspond with the exhaust gas ducts 19, 20; 119, 120 in the cylinder heads 11, 12; 111, 112. The intermediate wall 16; 116 is made of a gray cast iron material which is not subjected to hot corrosion in the operational temperature range. Thus, the requirement for a continuous protection of the intermediate wall 16; 116 from exhaust gas which has a hot corrosive effect in the case of other materials does not exist.

The water cooling of the exhaust pipe 13; 113 causes the desired lowering of the surface temperature and also has the effect that the thermal expansion of the exhaust pipe 13; 113, in the case of similar gray cast iron materials of the intermediate wall 16; 116 and the crankcase of the internal-combustion engine, corresponds approximately to the thermal expansion of the crankcase. As a result, constraining forces are avoided which would stress the fastening of the exhaust pipe 13; 113 on the cylinder heads 11, 12; 111, 112. The permanent tightness of the connecting joints of the exhaust pipe is therefore ensured.

In the longitudinal direction, the interior pipe is divided into individual sections of different lengths 17, 18; 117, 118 which all consist of cylindrically bent rectangular sheet metal blanks. Each section of the interior pipe 17, 18; 117, 118 is supported on the interior contour of webs constructed on the intermediate wall 16, 116.

With the exception of the exhaust gas inlet opening 22; 122 assigned to the last cylinder of a bank, one C-shaped section 17; 117 respectively is arranged in the area of the other exhaust gas inlet openings 21; 121 and, with its opening sector, is opposite the respective exhaust gas inlet opening 21; 121. The C-shaped sections 17; 117 are constructed to be thicker-walled by a factor of two than the circular sections 18; 118, whereby their hot gas shock load is improved with respect to the pulsating exhaust gas jet emerging from the exhaust gas ducts 19.

Figure 2:
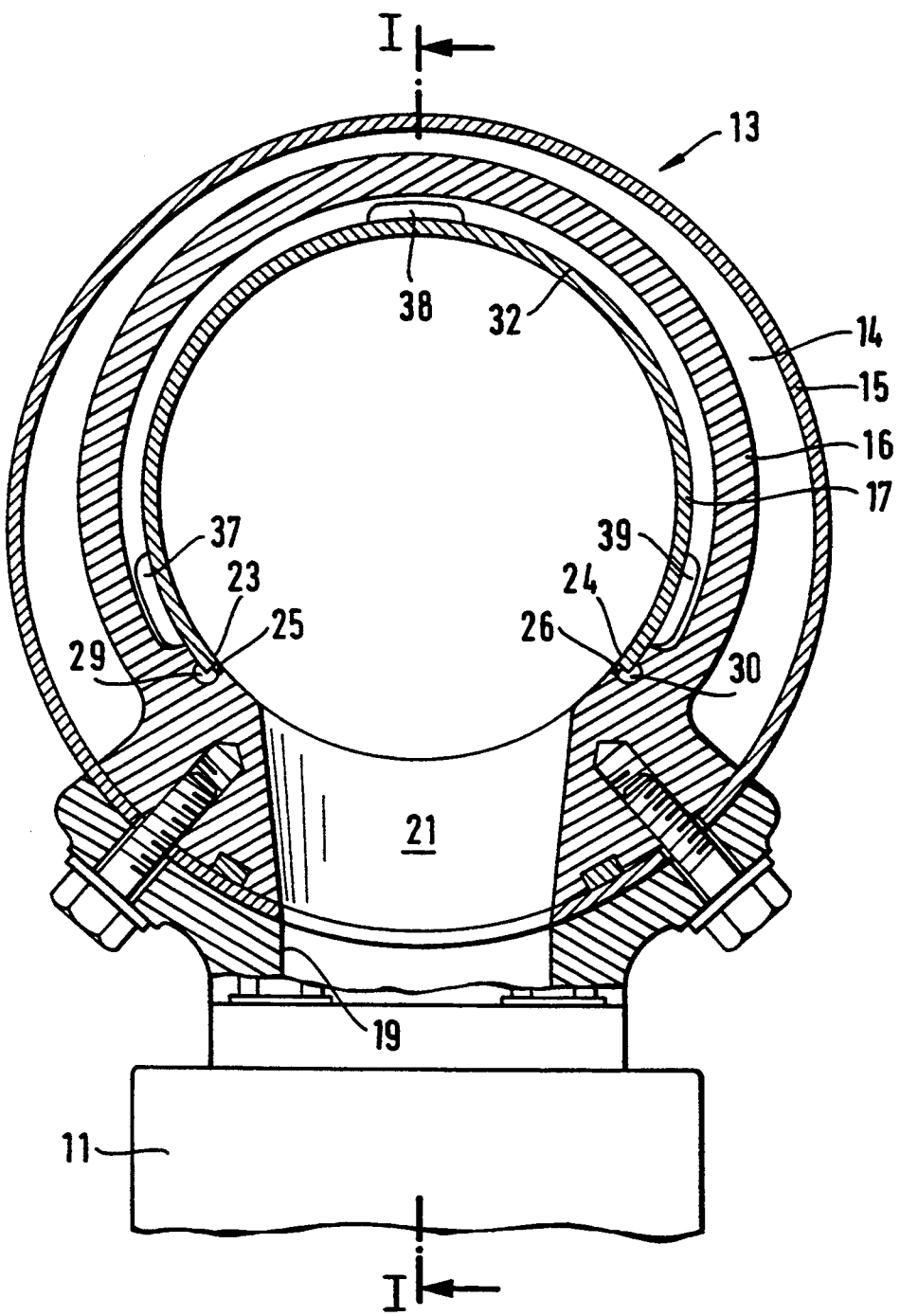
FIG. 2 is a cross-sectional view of the exhaust pipe along line II—II in FIG. 1.
Figure 3:
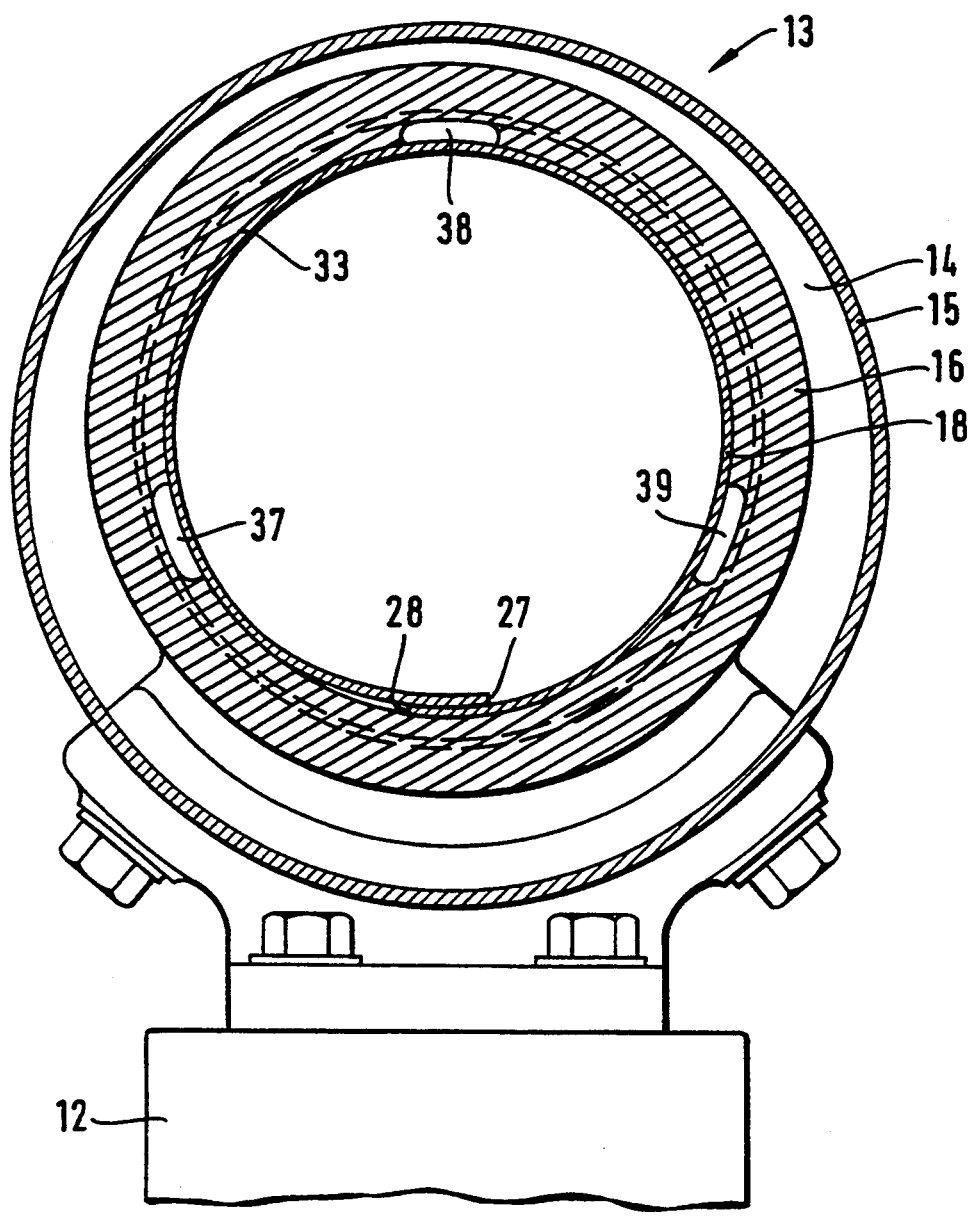
FIG. 3 is a cross-sectional view along line III—III in FIG. 1.

In the case of the first embodiment according to FIGS. 1-3, the sections 18 of the interior pipe which are adjacent to the C-shaped sections 17 have a circular cross-section with mutually overlapping longitudinal edges 27, 28 as seen in FIG. 3. Because of the closed circumference of the sections 18, the installation position of the overlapping of the edges is not important.

Figure 4:
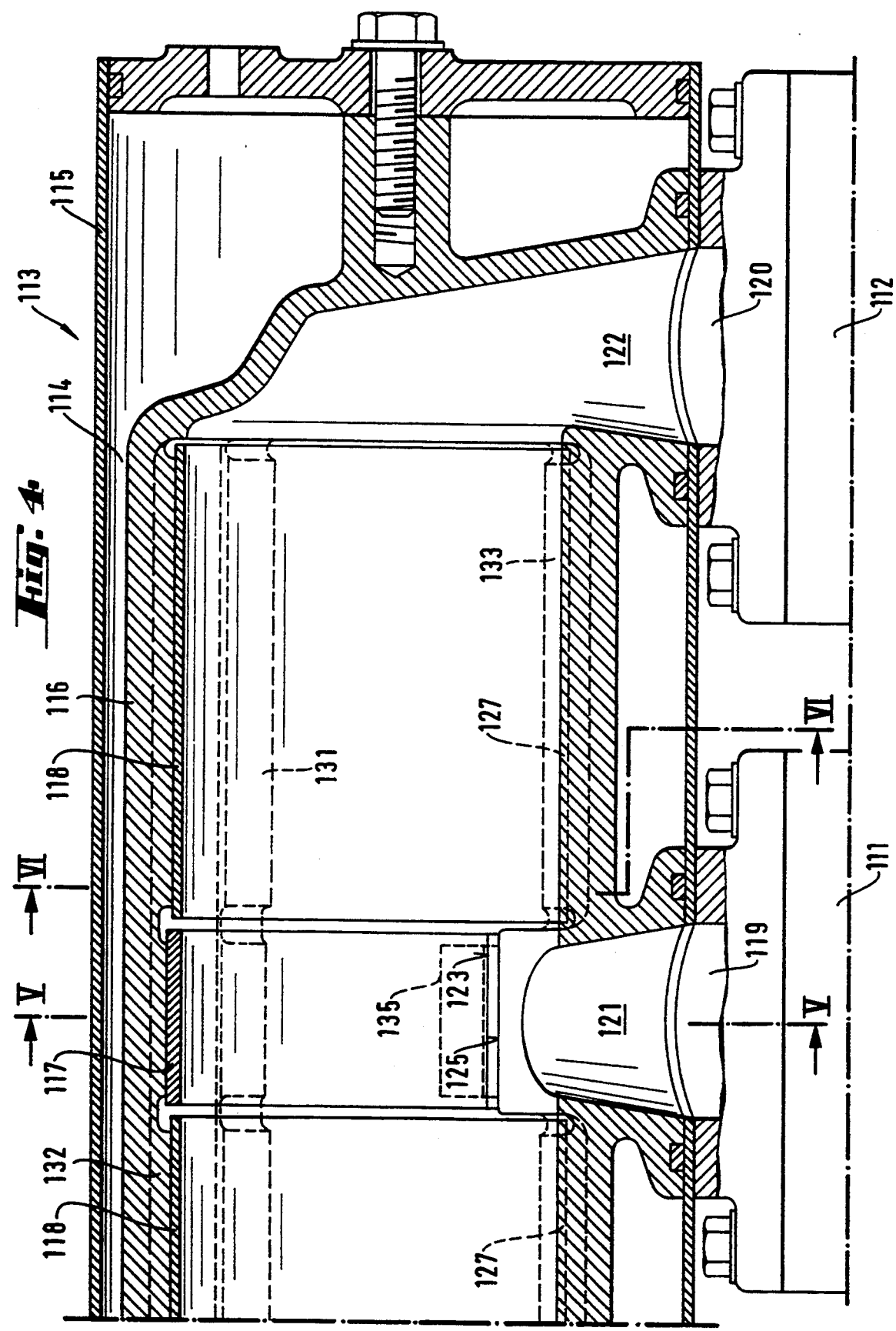
FIG. 4 is a longitudinal sectional view of an end of the exhaust pipe along line IV—IV in FIG. 5.
Figure 5:
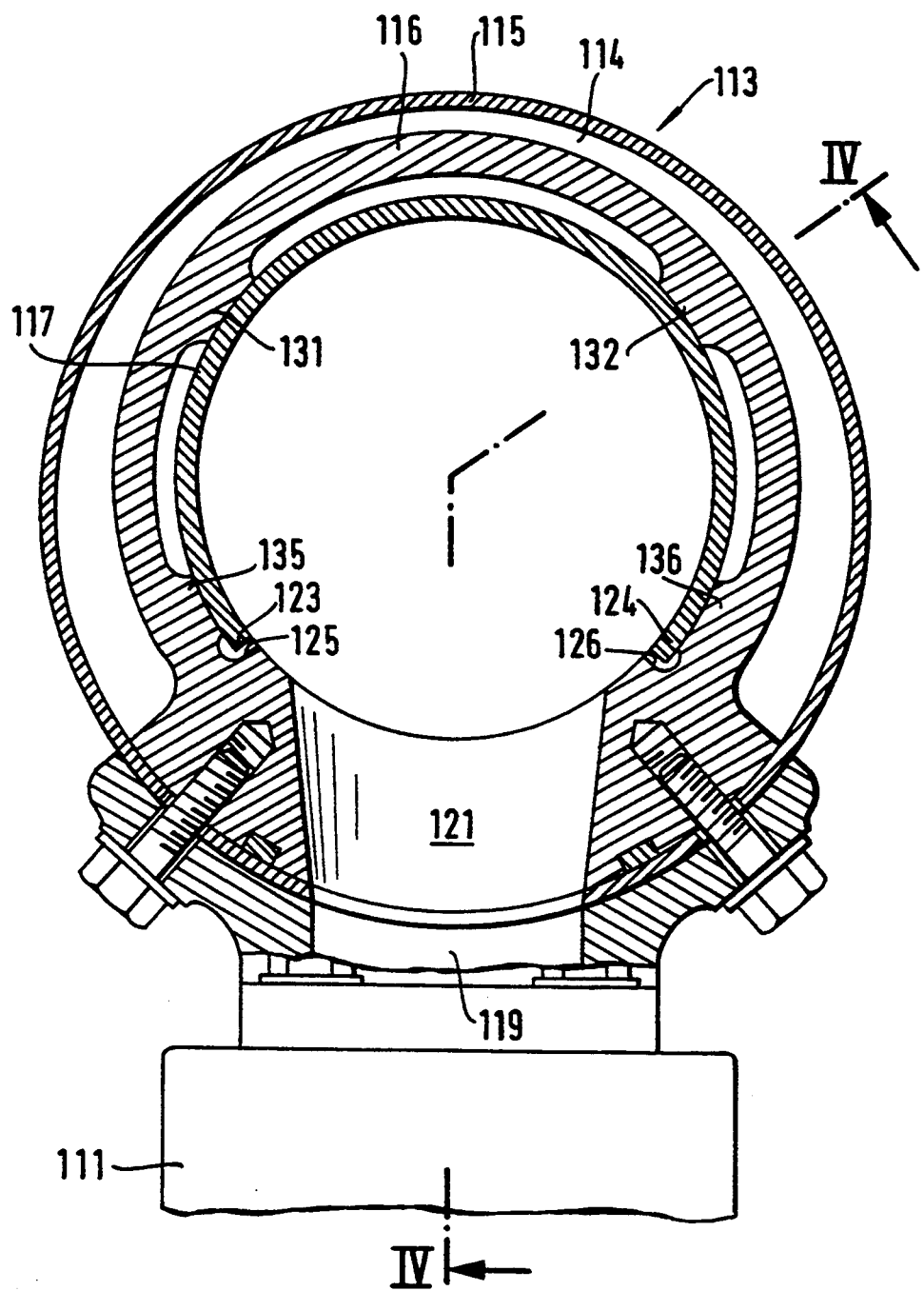
FIG. 5 is a cross-sectional view of the exhaust pipe along line V—V in FIG. 4.
Figure 6:
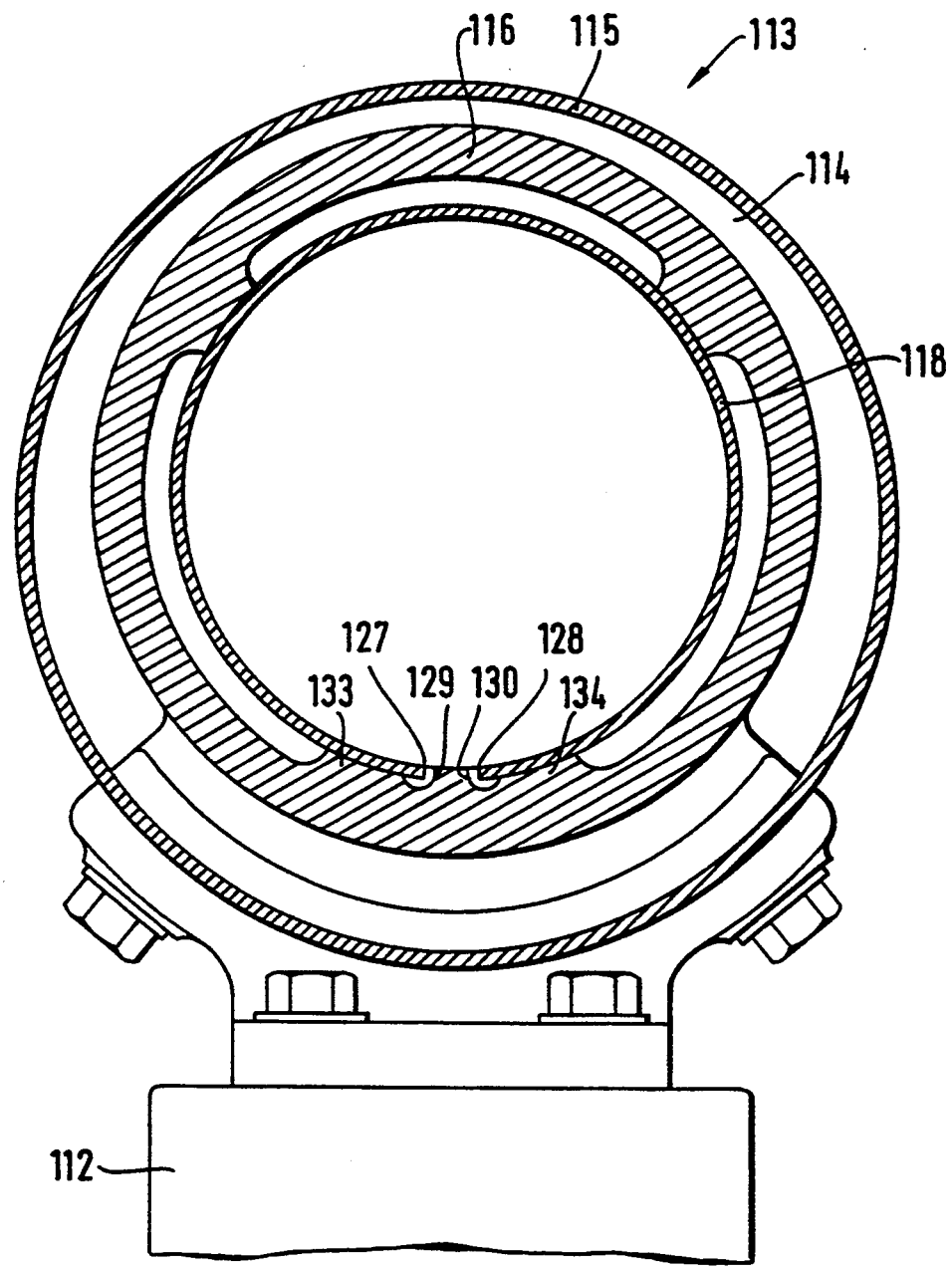
FIG. 6 is a cross-sectional view along line VI—VI in FIG. 4.

In the case of the second embodiment according to FIGS. 4-6, the sections 118 adjacent to the C-shaped sections 117 have an approximately circular cross-section, in which case the longitudinal edges 127, 128 of sections 118 are situated opposite one another at a distance as seen in FIG. 6.

Symmetrically to the exhaust gas inlet openings 21, 22; 121, 122, stop edges 25, 26; 125, 126, 129, 130 are constructed in the longitudinal direction on the intermediate wall 16, 116 which, in a manner that protects against torsion, interact with the longitudinal edges 23, 24; 123, 124, 127, 128 of sections 17; 117, 118.

During engine operation, sections 17, 18; 117, 118 are subjected to considerable heating by hot exhaust gas and, thermal expansions occur in the longitudinal and the circumferential direction. In order to avoid constraining forces which may result from an impaired heat expansion, expansion joints are required. In the longitudinal direction of the exhaust pipe, expansion joints are provided between the sections 17, 18; 117, 118 because of the fact that the lengths of the sections 17, 18; 117, 118 are somewhat smaller than the respective gauges of the subdivision into sections. Expansion joints in the circumferential direction are formed by the distance of the respective adjacent stop edges 25, 26; 125, 126, 129, 130 being smaller than the distance between the respective assigned longitudinal edges 23, 24; 123, 124, 127, 128 of sections 17; 117, 118. In the case of sections 18, the compensation of the expansion in the circumferential direction takes place by changing the overlapping width of the longitudinal edges 27, 28.

The essential difference between the two above-described embodiments resides in the construction of the webs on the interior contour of the intermediate wall 16; 116 on which the sections 17, 18; 117, 118 of the interior pipe are supported.

In the case of the first embodiment according to FIGS. 1-3, webs 31, 32, 33 are arranged on the interior wall 16 in the circumferential direction. In the area of the assigned circumferential edges of the sections 17, 18, each web 31, 32, 33 has a circumferential groove 34, 35, 36. Correspondingly, longitudinal grooves 29, 30 are also constructed in parallel to the stop edges 25, 26. The grooves ensure a flush contact of the sections 17 on the webs 31, 32, 33.

In the case of the second embodiment according to FIGS. 4-6, webs 131, 132, 133, 134, 135, 136 are arranged parallel to one another in the longitudinal direction on the inner circumference of the intermediate wall 116. The webs 131, 132, 133, 134, 135, 136 are interrupted in the area of the circumferential edges of the sections 117, 118.

The operation for the inserting of the sections 17, 18; 117, 118 of the interior pipe into the intermediate wall 16, 116 is the same in the case of the two embodiments. From the end-face open end (not shown) of the intermediate wall 16, 116, the individual sections 17, 18; 117, 118 are inserted by a clamping device and are placed at the assigned locations.

The clamping device reaches around one end face of a section respectively at three points. In this case, the outside diameter of the section is elastically reduced to such an extent that it can pass through the smallest opening cross-section of the intermediate wall. After the intended position of the section has been reached, the clamping device is released, and the section is placed against the assigned webs on the intermediate wall. The sections 17, 18; 117, 118 are preshaped such that, in the inserted condition, they rest against the webs while being radially prestressed.

In the case of the embodiment of FIGS. 1-3, based on the end-face open end of the intermediate wall 16, three axial grooves 37, 38, 39 are required in the respective webs 31, 32, 33 and permit the passage of the gripping fingers of the clamping arrangement during the assembly of the sections 17, 18.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An exhaust pipe for a supercharged multi-cylinder internal-combustion engine comprising an interior pipe carrying hot exhaust gases, and a housing which surrounds the interior pipe at a distance therefrom, has an approximately cylindrical intermediate wall and a cylindrical shell which is supported on the intermediate wall, and the interior pipe being divided into individual sections in a longitudinal direction, each section of the interior pipe being configured approximately cylindrically from a rectangular sheet metal blank, and the intermediate wall having exhaust gas inlet openings, wherein the intermediate wall is provided with webs extending radially inwardly, each section of the interior pipe supported on an interior contour of assigned webs, one of the sections of the interior pipe respectively has a C-shaped cross-section and is arranged with an opening sector opposite a respective one of the exhaust gas inlet openings, and the other of the sections of the interior pipe is adjacent to the respective one of the exhaust gas inlet opening have an approximately circular cross-section.

2. The exhaust pipe according to claim 1, wherein the webs are circumferentially on the intermediate wall.

3. The exhaust pipe according to claim 2, wherein longitudinal edges of the sections are arranged in mutually overlapping manner.

4. The exhaust pipe according to claim 1, wherein a plurality of webs are arranged in a spaced manner on an inner circumference of the intermediate wall and extend in the longitudinal direction.

5. The exhaust pipe according to claim 4, wherein longitudinal edges of the sections are spaced opposite one another and interact with stop edges in a manner that protects against torsional influences.

6. The exhaust pipe according to claim 1, wherein the distance of the stop edges, which are arranged symmetrically with respect to the exhaust gas inlet openings, is shorter than the distance of the longitudinal edges of the associated sections.

7. The exhaust pipe according to claim 5, wherein the distance of the stop edges, which are arranged symmetrically with respect to the exhaust gas inlet openings, is shorter than the distance of the longitudinal edges of the associated sections.

8. The exhaust pipe according to claim 1, wherein the C-shaped sections of the interior pipe walls thicker than the other sections.

9. The exhaust pipe according to claim 1, wherein the intermediate wall is a gray cast iron material.

10. The exhaust pipe according to claim 1, wherein the housing is undivided in longitudinal and transverse directions.

11. The exhaust pipe according to claim 1, wherein the cylindrical shell is sealingly supported on the intermediate wall.

12. The exhaust pipe according to claim 1, wherein longitudinal edges of the C-shaped sections of the interior pipe are operatively arranged, with stop edges constructed on the intermediate wall in the longitudinal direction to protect against torsional influences.

13. The exhaust pipe according to claim 1, wherein the housing has a cooling water space constructed between the intermediate wall and the cylindrical shell.

* * * * *